Feb. 21, 1956

G. D. OLSSON 2,735,896

DAMPING MEANS FOR SELECTING FINGERS
IN CROSSBAR SWITCHES OR THE LIKE
Filed Dec. 28, 1951

Gunnar Daniel Olsson
INVENTOR

By Richardson, David and Nordon
his ATTYS.

United States Patent Office 2,735,896
Patented Feb. 21, 1956

2,735,896

DAMPING MEANS FOR SELECTING FINGERS IN CROSSBAR SWITCHES OR THE LIKE

Gunnar Daniel Olsson, Stockholm, Sweden

Application December 28, 1951, Serial No. 263,803

5 Claims. (Cl. 179—27.54)

The present invention relates to damping means for use in crossbar switches and the like. It is the object of the invention to damp vibrations of the selecting fingers attached to the selecting bars on the movement of the bars.

It has previously been suggested to solve this problem by providing a flange at the fixed end of the selecting finger, the flange having a surface at right angles to the longitudinal direction of the finger and being pressed against the bar by means of a spring. This arrangement however involves considerable wear of the lower portion of the selecting finger and, in addition, the relative movement between the finger and the selecting bar becomes obstructed too much.

The arrangement according to the present invention relates to such damping devices in which the selecting finger is surrounded at some suitable point along its length by a damping member, hitherto usually consisting of a screw spring which is so arranged that it is freely movable in a plane at right angles to the longitudinal direction of the selecting finger. The arrangement according to the invention is improved so as to cause a further reduction of the injurious vibrations and at the same time to overcome the above mentioned disadvantages. The invention is foremost characterized by the fact, that inside a first hollow damping member on the selecting finger there is provided a second hollow damping member surrounding the selecting finger, both said damping members being movable in relation to each other and to the selecting finger in a plane substantially perpendicular to the longitudinal direction of the selecting finger. Within the scope of the invention the damping members may each have any suitable shape and weight and be combined in different ways and may for instance consist of screw springs, tubular sleeves, rings or balls or combinations thereof. It is also possible to use more than two damping members without departing from the inventive idea.

The invention will be described more in particular in conjunction with the accompanying drawing which shows three different embodiments of the invention.

Figure 1:
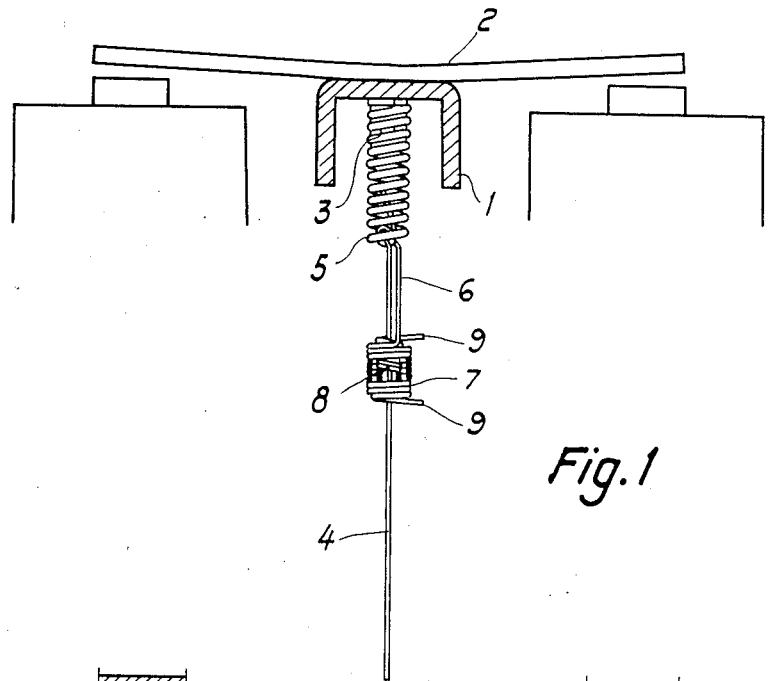

In figure 1 a part of a crossbar switch is shown comprising a selecting bar 1 (shown in cross section) to one end of which an armature 2 is attached. The bar 1 has U-formed cross section and carries at its bottom a number of cylindrical supporting studs 3 for the selecting fingers which consist of wires 4. At its fixed end each wire 4 is shaped in the form of a helical spring portion 5. This spring portion is passed over the stud 3 in order to make the selecting finger resilient so that it can be retained by a holding bar when the selecting bar returns to its rest position or is rotated to a second operated position. A first damping member 7 which is in the form of a screw, surrounds the selecting finger 4 so as to form a space between it and the selecting finger. The screw spring of member 7 continues into a straight portion 6, which is freely suspended by means of a loop at the utmost turn of the spring portion 5 or possibly by means of a special supporting loop made on the straight portion of the selecting finger 4. In the space between said first damping member 7 and the selecting finger 4 there is an additional damping member 8 also in the form of a screw spring so dimensioned and arranged that it is movable in relation to the first damping member 7 as well as to the selecting finger 4 in a plane substantially perpendicular to the longitudinal direction of the latter. The screw spring 8 at both extremities is provided with radially or tangentially directed extensions 9 or lugs serving to retain the spring 8 inside spring 7.

Figure 2:
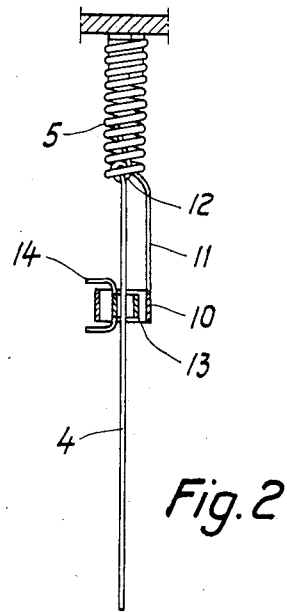

In Figure 2 a second embodiment of the invention is shown. According to this embodiment the damping means consists of an outer hollow cylinder 10 which is loosely connected to the turns of spring portion 5 by means of a piece of wire 11 attached to the periphery of the cylinder and suspended by a loop 12. An additional hollow cylinder 13 is arranged inside cylinder 10. The cylinder 13 is provided with two lugs 14 which are directed outwards and retain loosely the inner cylinder inside the outer cylinder.

Figure 3:
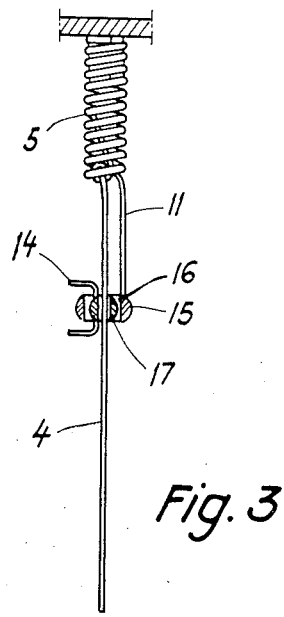

Figure 3 shows a third embodiment of the invention in which the damping means consists of an outer ball-shaped member 15 which is provided with a hole 16 in which an inner ball-shaped member 17 is arranged. The members 15 and 17 are retained in their respective positions in the same way as shown in Fig. 2.

I claim:

1. In crossbar switches and the like having swingable selecting fingers, a damping device for damping vibrations of the associate selecting finger, said damping device comprising a first hollow member surrounding one of said selecting fingers and leaving a free space between it and the selecting finger, a second hollow member surrounding said first hollow member and having a free space between it and the said first hollow member, and holding means for holding said first and said second hollow members in a predetermined axial position on the selecting finger, said holding means being so constructed and arranged as to guide the said hollow members in their transverse direction so as to permit them to move freely relative to each other and to said selecting finger.

2. A damping device according to claim 1, in which the said first and second hollow members consist respectively of screw springs.

3. A damping device according to claim 1, in which one of the said hollow members is provided with holding means formed by projections extending transversely across end portions of the other of said hollow members, and holding means are provided for the last mentioned hollow member for holding it in a predetermined axial position on said selecting finger.

4. A damping device according to claim 1, in which said damping members consist of hollow cylinders.

5. A damping device according to claim 1, in which said damping members consist of hollow balls.

References Cited in the file of this patent

UNITED STATES PATENTS

| | | |
|---|---|---|
| 1,766,995 | Hofmann | June 24, 1930 |
| 2,028,930 | Taylor | Jan. 28, 1936 |
| 2,039,630 | Burwell | May 5, 1936 |